Aug. 11, 1953

WOLF-DIETER BENSINGER
ROTARY VALVE CONTROLLED MULTICYLINDER
INTERNAL-COMBUSTION ENGINE
Filed Sept. 16, 1949

2,648,318

INVENTOR
WOLF DIETER BENSINGER

BY Haseltine Lake & Co,
AGENTS

Patented Aug. 11, 1953

2,648,318

UNITED STATES PATENT OFFICE 2,648,318

ROTARY VALVE CONTROLLED MULTICYLINDER INTERNAL-COMBUSTION ENGINE

Wolf-Dieter Bensinger, Muhlacker, Wurttemberg, Germany, assignor to Daimler-Benz Aktiengesellschaft, Stuttgart-Unterturkheim, Germany Application September 16, 1949, Serial No. 116,023
In Germany October 1, 1948

12 Claims. (Cl. 123—59)

The present invention relates to a rotary valve control mechanism for multicylinder internal combustion engines in which the cylinders have axial ports controlled by means of rotary disc valves located in the cylinder head.

The invention is based on the idea that the use of rotary disc valves in internal combustion engines having in-line cylinders permits the control of every two adjacent cylinders. Each rotary valve may have two diametrically opposed control ports, which in succession alternatively effect control. In this case the reduction ratio of the shaft of the rotary valve to the crank-shaft of a four-cycle engine is 4:1. It is convenient, however, to make the crank angle for the firing order of the two cylinders only about 240° or less. A greater crank angle would bring about the danger that (measured on the control circle of the rotary valve) the outlet of the one cylinder and the inlet of the other would come so close together that the port of the rotary valve controlling them in common would permit the simultaneous passage of the induction gases of the one cylinder and of the exhaust gases of the other thereby causing an induction of exhaust gases and a reduction of the power output of the engine.

As in the case of four-cycle in-line engines the crank angle for the firing order between the first and the second cylinders and between the third and the fourth cylinders as a rule will be 180°, two rotary valves are sufficient for the four cylinders. In the case of a regular six-cylinder in-line engine, however, the crank angle for the firing order of adjacent cylinders amounts every time to 240° with the exception of that between the third and fourth cylinders which is 360°. As a rule it is therefore not possible in this case to control every time two adjacent cylinders by a common rotary valve. However, four rotary valves in total will be sufficient if, according to the invention, three adjacent cylinders are controlled by two rotary valves in a particular convenient manner such that each rotary valve controls the inlet and outlet ports of one cylinder and simultaneously at least the inlet or outlet port of an adjacent cylinder.

According to a modification of the invention, provision may be made for controlling two cylinders by one rotary valve and a third adjacent cylinder by a second rotary valve.

Figure 1:
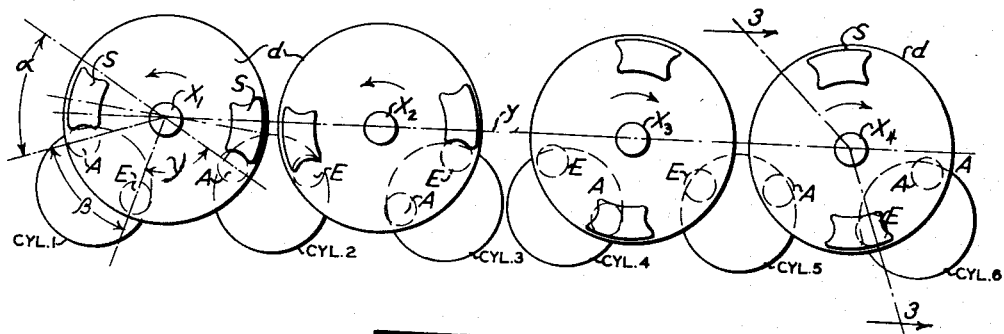
Figure 2:
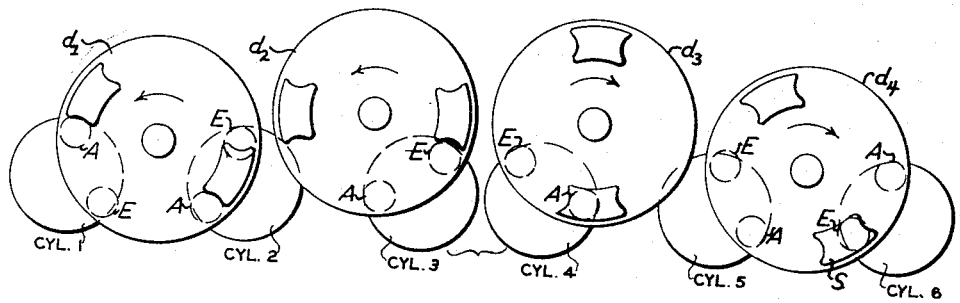
Figure 3:
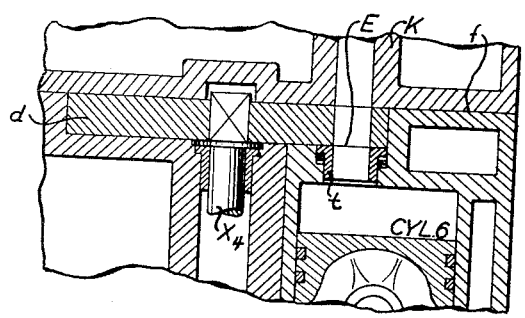

Further details of the invention will appear from the following description of examples of construction in connection with the accompanying drawings, in which by way of example Figs. 1 and 2 give a diagrammatic view of the cylinder in-line bank of a six-cylinder engine with the associated rotary valves and Fig. 3 a section along the line 3—3 of Fig. 1.

In Fig. 1 illustrating a first embodiment of the invention, the two control ports $s$ of a rotary valve $d$ control the inlet port E and the outlet port A of the one cylinder and simultaneously the inlet port E or the outlet port A of an adjacent cylinder. The conventional firing order will be 1—5—3—6—2—4 with a crank angle of 120°, the number of revolutions of the rotary valves being one fourth of that of the crankshaft. The outlet port A of the cylinder 1 will be uncovered by the left-hand control port $s$ by the angle $\alpha$ = about 60° (= about 240° at the crank shaft) later than the outlet port A of the cylinder 2 by the right-hand control port $s$. The angle $\beta$ between the inlet and the outlet ports of the cylinder 1 is likewise about 60° (240° at the crankshaft) so that there will be likewise an angle $\gamma$ of the magnitude of 60° between the inlet and the outlet ports of the adjacent commonly controlled cylinders 1 and 2. This angle in general will be sufficient to avoid simultaneous uncovering of inlet and outlet ports of the same or of the adjacent cylinder by the same control port, which with certainty would no longer be the case with a crank angle for the firing order of substantially more than 240° between adjacent cylinders i. e. with the angle $\alpha$ substantially surpassing 60°.

Owing to the symmetrical and uniform control of the cylinders by the rotary valves (i. e. of every 1½ cylinders by one rotary valve) further all of the axes $x1$ to $x4$ of the rotary valves may be located in a plane extending through the line $y$ and parallel with a plane through the cylinder axes, and the drive connections of the rotary valves will likewise be of uniform design. Thus the cylinder covers ($k$ in Fig. 3) of the cylinders 1 to 3 and 4 to 6 may be designed as completely uniform parts capable of being interchanged with each other. The diameter of the inlet and outlet ports are equal at the level of the parting line $f$ between cylinder and cylinder cover. The interchangeability of cylinder cover and rotary valve drive connections means a particular advantage in manufacturing.

In Fig. 2 illustrating a second embodiment of the invention, the rotary valve $d1$ controls the cylinders 1 and 2 and the rotary valve $d2$ the cylinder 3. The cylinder 4 is controlled by the rotary valve $d3$ and the cylinders 5 and 6 are controlled by the rotary valve $d4$. With the arrangement just described, however, some different constructional conditions will result as compared with the example of construction of Fig. 1. Thus with a drive connection by means of a camshaft extending parallel to the crankshaft for the rotary valves $d2$ and $d3$, gears of a different diameter are necessary compared to those used for the rotary valves $d1$ and $d4$. The cylinder covers (not shown) for the cylinders 1 to 3 and 4 to 6 are in the example illustrated only reflected symmetrical parts which therefore cannot be interchanged with each other. However, this interchangeability may be made possible, if desired, e. g. by making the rotary valve d3 control the cylinders 4 and 5 and the rotary valve d4 only the cylinder 6. In the case of Fig. 2 there is further the possibility of arranging the rotary valves in alignment as in Fig. 1, if there are no objections to an unequal distance between the engine cylinders and to providing e. g. a greater distance between the cylinders 2 and 3 and the cylinders 4 and 5 than between the remaining cylinders.

The rotary valves may be driven in both embodiments by means of bevel gears, spiral or worm gears, while for suitably packing the inlets and outlets of the cylinders a piston ring type seal $t$ may be used as in Fig. 3, which resiliently abuts from below on the rotary valve. A corresponding packing may also be provided at the top of the rotary valve.

The scope of the invention is not limited to three- or six-cylinder engines but includes all engines coming within the appended claims.

What I claim is:

1. Control mechanism for the intake and exhaust ports of the in-line cylinders of an internal combustion engine having cylinders in a number which is a multiple of three comprising a pair of similar interchangeable rotary valves for each three cylinders positioned eccentrically with respect to the cylinders, the cylinders having intake and exhaust ports so arranged that both ports of an end one of said three cylinders are controlled by a first valve of said pair, both ports of the other end cylinder being controlled by the second valve of said pair, and at least one port of the intermediate cylinder being controlled by said first valve.

2. Control mechanism for the intake and exhaust ports of the in-line cylinders of an internal combustion engine having cylinders in a number divisible by three comprising similar interchangeable rotary valves positioned eccentrically with respect to the cylinders and each overlapping two adjacent cylinders, the cylinders having intake and exhaust ports so arranged that both ports of one cylinder and one port of the adjacent cylinder are controlled by a common valve.

3. Control mechanism for the intake and exhaust ports of the in-line cylinders of an internal combustion engine having cylinders in a number divisible by three comprising similar interchangeable rotary valves positioned eccentrically with respect to the cylinders, the cylinders having intake and exhaust ports so arranged that both ports of two adjacent cylinders of a consecutive group of three are controlled by one valve and both ports of the third cylinder by another valve.

4. Control mechanism as in claim 1 wherein the valves comprise discs having diametrically opposed control ports therein and rotatable on axes parallel to the cylinder axes.

5. Control mechanism as in claim 3 for a six-cylinder engine, wherein the intake and exhaust ports of the pairs of cylinders at each end of the line are all controlled by a single valve common to both cylinders of the pair and the intake and exhaust ports of each of the intermediate cylinders of the line are both controlled by a further valve.

6. Control mechanism as in claim 2 wherein the axes of rotation of all the valves lie in a common plane parallel to the plane of the cylinder axes.

7. Control mechanism for the in-line cylinders of an internal combustion engine having cylinders in a number divisible by three each having an intake port and an exhaust port, said mechanism comprising a rotary valve between each two cylinders of a consecutive group of three cylinders, the axes of rotation of the valves being substantially parallel to the ports, and the ports being so positioned that both ports of the outlying cylinder of a group of three and one port of the middle cylinder of the group are substantially in a circle centered on the axis of rotation of the valve positioned between said outlying and middle cylinders, and two control ports in each valve positioned on either side of the axis of rotation and constructed and arranged to control the two ports of said outlying cylinder and the one port of said middle cylinder as the valve rotates on its axis.

8. Control mechanism as in claim 7 wherein all the valves are similar and interchangeable.

9. Control mechanism as in claim 7 wherein the three ports controlled by a common valve are so arranged that the radii of the valve passing through their centers define an angle of substantially 120°.

10. Control mechanism for the cylinders of a six-cylinder in-line internal combustion engine comprising an intake port and an exhaust port for each cylinder, two rotary valves each positioned between two adjacent cylinders of a consecutive group of three cylinders, the axes of rotation of the valves being substantially parallel to the ports, two control ports in each valve positioned on either side of the axis of rotation, the intake and exhaust ports of the cylinders and the control ports of the valves being so constructed and arranged with respect to the axes of rotation that the six ports of a group of three cylinders are controlled by the four ports of the two associated valves as the latter rotate on their axes, at least both ports of the two outlying and inlying cylinders of a group being each controlled by the ports of one valve and each port of the middle cylinder of the group being so positioned with respect to the axis of rotation of the cooperating one of the two valves that the radii of said valves passing through their centers and the radius of the cooperating valve passing through the center of the corresponding port of the other of the three cylinders controlled by the same valve define angles of 120°, the two ports of said middle cylinder being each controlled by the control ports of the said same valve.

11. Control mechanism as in claim 10 wherein the ports of the middle cylinder are so arranged that each of them is controlled by only one of the valves, the said angles of 120° being defined in reference to the axis of the associated valve.

12. Control mechanism as in claim 10 wherein the ports of the middle cylinder are so arranged that they are both controlled by a same valve, the said angles of 120° being defined in reference to the axis of said same valve.

WOLF-DIETER BENSINGER.

References Cited in the file of this patent

UNITED STATES PATENTS

| Number | Name | Date |
| --- | --- | --- |
| 1,230,613 | Staver | June 19, 1917 |
| 1,597,359 | Hansen | Aug. 24, 1926 |

FOREIGN PATENTS

| Number | Country | Date |
| --- | --- | --- |
| 176,023 | Great Britain | Sept. 3, 1920 |
| 358,912 | Germany | Sept. 16, 1922 |
| 378,334 | Germany | July 12, 1923 |